United States Patent [19]

Jenkins, Jr.

[11] 3,790,718

[45] Feb. 5, 1974

[54] SOLID STATE DIAL SELECTOR SIGNALLING APPARATUS

[76] Inventor: Edgar W. Jenkins, Jr., P.O. Box 6, Belle Chasse, La. 70037

[22] Filed: Dec. 21, 1970

[21] Appl. No.: 99,979

[52] U.S. Cl. ............... 179/17 D, 179/84 SS, 179/99

[51] Int. Cl. ............... H04m 13/00

[58] Field of Search ... 179/17 D, 99, 84 SS, 18 AD, 179/1 H, 17 E, 37–40

[56] References Cited

UNITED STATES PATENTS

| | | | |
|---|---|---|---|
| R26,079 | 9/1966 | Cooper | 179/84 SS X |
| 3,046,526 | 7/1962 | Scantlin | 179/84 SS X |
| 3,259,698 | 7/1966 | Korda et al. | 179/1 H X |
| 3,064,236 | 11/1962 | Coleman | 179/85 |
| 3,365,547 | 1/1968 | Fahey | 179/17 D |
| 3,033,931 | 5/1962 | Smith | 179/17 D |

*Primary Examiner*—Thomas W. Brown
*Attorney, Agent, or Firm*—Wilkinson, Mawhinney & Theibault

[57] ABSTRACT

The invention comprises a separate signalling apparatus for use with a party line communications system to signal the called party. Each station includes a dial selector interconnected to all telephone instruments of the other stations for producing an output to the associated decoder and ringer units when its station is dialed. The decoder unit provides a go or no-go signal to actuate the ringer only when its station is being called. Integrated chips and JK flip-flops provide a reliable solid state apparatus. For use with an intercom system, the stations share a single dial selector but the other components are the same.

29 Claims, 6 Drawing Figures

INVENTOR
EDGAR W. JENKINS, JR.

BY Wilkinson, Mawhinney & Theibault
ATTORNEYS

INVENTOR
EDGAR W. JENKINS, JR.
BY Wilkinson, Mawhinney & Theibault
ATTORNEYS

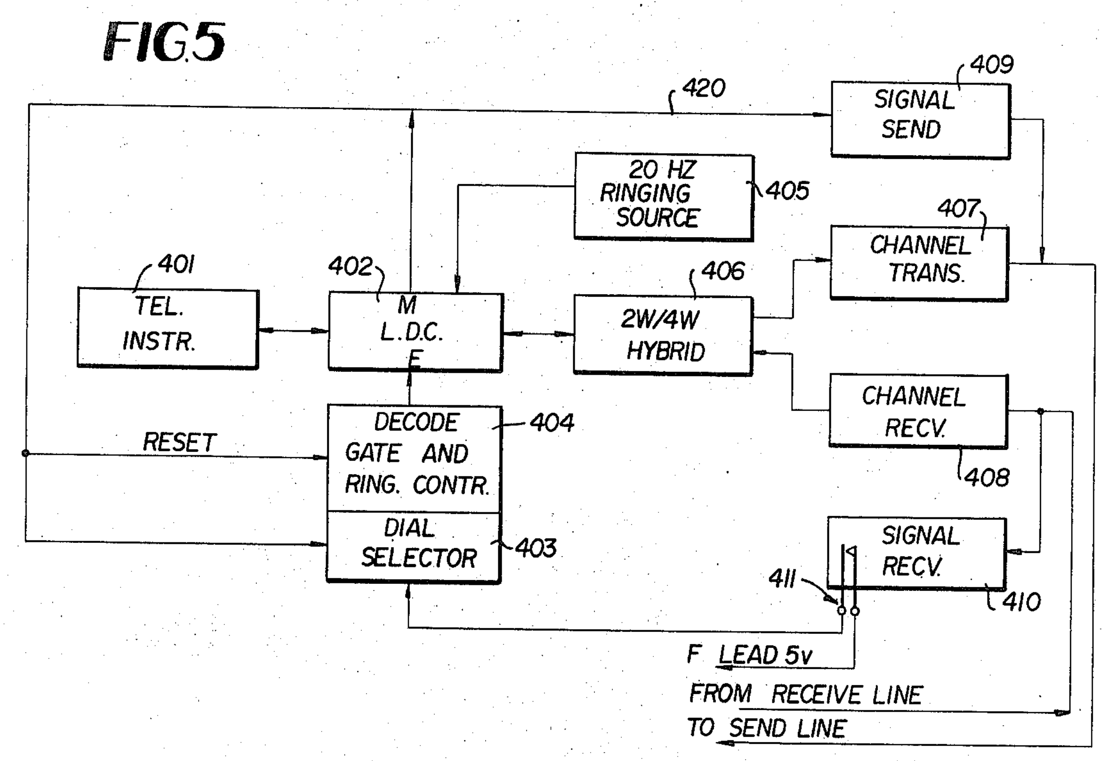
FIG.4
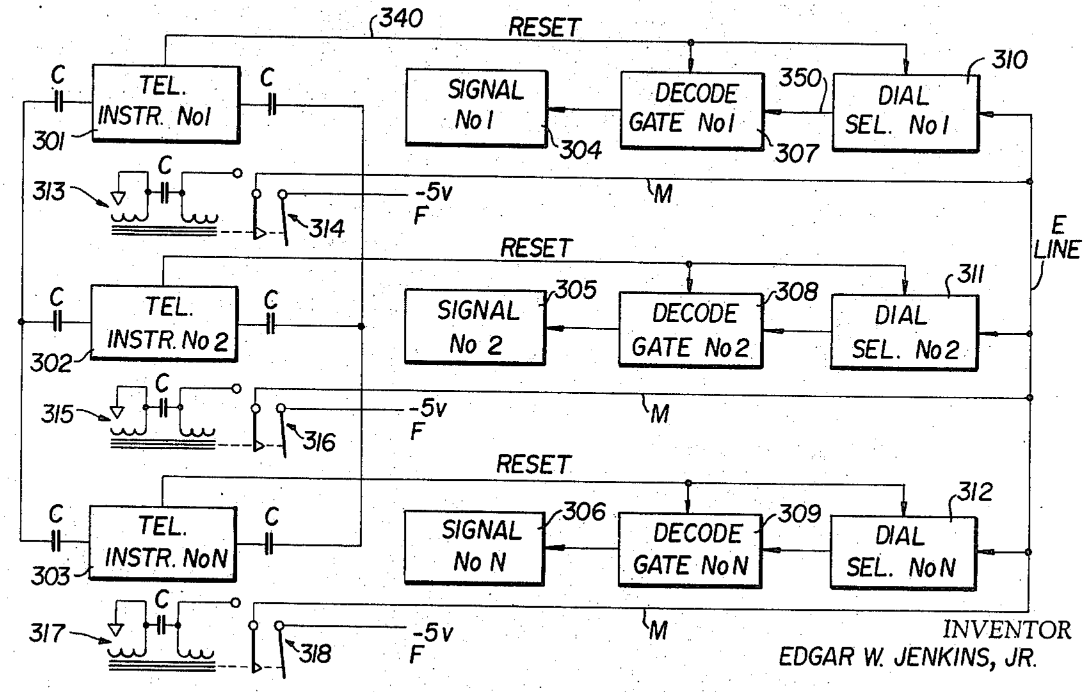
INVENTOR
EDGAR W. JENKINS, JR.
BY Wilkinson, Mawhinney & Theibault
ATTORNEYS

SOLID STATE DIAL SELECTOR SIGNALLING APPARATUS

The present invention provides a separate signalling arrangement for use in conjunction with a party line communications system for signalling the party being called. It converts telephone dial pulses transmitted by a conventional communications system into a form of intelligence, which is used to signal the selected or called party. For example, the party line communications circuit may comprise a physical telephone circuit, a wire line or cable carrier circuit, a micro-wave multiplex circuit or a two-way radio circuit, and the invention operates in conjunction with the separate signalling circuit that is normally provided apart from such audio or voice circuits.

In physical telephone circuits of either the conventional wire line or multi-conductor cable type, the audio or voice is usually carried by one pair of conductors and the signalling is achieved over one or more additional pairs of conductors.

In wire line and cable carrier circuits, micro-wave multiplex and two-way radio circuits, the signalling is carried by auxilliary signalling tones and these tones may be any one of several types depending on the basic communications circuit. One type is the "out of band" signalling, wherein, through the use of appropriate audio frequency filters, the frequency band width available for audio transmission is divided into two sections. The low section (usually below 3,000 HZ) is utilized for transmission of voice or other audio frequencies while the upper section is used to carry the signalling tones. These tones may be of the on-off (or amplitude modulated) type or they may be of the FSK (or frequency shift) type.

Another similar type called "in band" signalling utilizes the same type tones operating within the audio pass band (300–3,000 HZ) of the basic communication equipment. Usual "in band" signalling uses an A.M. (on-off) tone operating within the audio passband. The tone is keyed "on" while the circuit is idle and keyed "off" while busy. Signalling is therefore accomplished by pulsing the tone "off" and "on" as required to transmit the desired signalling intelligence. A variation of this type of signalling is known as "speech plus" and involves using tones within the audio pass band, but keeping the tones and the audio separated through the use of appropriate audio filters in a manner similar to that used in "out of band" signalling. The difference between the two being that "speech plus" signalling involves using tone filters within the audio pass band of 300–3,000 HZ so that tone "on" while busy may be used while the standard "in band" uses no filters.

An additional signalling method, known as "carrier leak" is used only when the communications circuit is provided by single side band, suppressed carrier wire line or cable carrier equipment or micro-wave multiplex equipment. In this type of equipment, the communication channel carrier is normally suppressed by appropriate filters. Signalling is accomplished through bypassing some of the carrier around the filters. If this bypass arrangement is pulsed, as by dialing a telephone connected to it, the signalling is transmitted as an absence and presence of the carrier.

It is the purpose of the present invention to serve as the signalling system for any of the above described communications systems, when used in a party line arrangement, because none of the above described communications systems involves switching of the audio or voice circuit. It is in conjunction with such arrangements that the present dial selector system converts dial pulses, through the application of solid state apparatus and logic techniques, into a signalling arrangement for selecting the called party.

In the principal embodiment, for signalling in conjunction with a party line communication system, each station includes a pulse generator, such as a dial telephone, a dial selector capable of providing an output unique to the number of its station, a decoder for sensing its associated dial selector output and initiating a ringer mechanism when that station's unique number is dialed to ring a sounder, such as the bell of the telephone equipment.

The dial telephones and dial selectors are interconnected such that removal of any telephone off its hook, arms all selectors and the dialing of any hook-removed telephone equipment causes each selector to be advanced in accordance with a predetermined sequence of the station identifying numbers, such as 1, 2, 3, et cetera. However, only the decoder at the called station will be fully activated to initiate ringing. In the typical application of dial selection over open wire or cable systems (FIG. 4), when telephone instrument No. 1 comes off-hook, a modified hook-switch arrangement will hold No. 1 decode gate and dial selector No. 1 in reset condition even though operation of "E" line will remove reset condition from all other stations in preparation for receiving dial pulses from Station No. 1.

If Station No. 1 dials Station No. N, the modified telephone instrument of No. N will apply reset signal to No. N decode gate and No. N dial selector when Station No. N answers. This will trip ring signal.

But, in a typical application of dial selection to carrier or multiplex systems (FIG. 5), when any station comes off-hook to place a call, operation of that station's "M" lead will hold his own decode gate and dial selector in reset. However, receipt of "E" signal at all other stations will remove reset and prepare stations for receipt of dial pulses. When called station answers, operation of its own "M" lead will reset its own decode gate and dial selector, tripping ring. At end of conversation (when all parties are on-hook again), removal of all "E" signals will reset all dial selectors.

In the typical application of dial selectors to local dial intercom systems (FIG. 6), when Station No. 1 comes off-hook to place call, its decode gate is held in reset condition by modified telephone instrument. If Station N is called, its modified telephone instrument will reset No. N reset when it comes off-hook to answer, tripping ring. At end of conversation, both parties go on-hook and split winding relay 515 will release removing "E" signal from dial selector, causing it to reset.

The specific application of the subject signalling arrangement over an open wire or cable system illustrates the use of a common signal input lead for all dial selectors reached by each instrument, and further wherein the answering of the station dialed operates to initiate resetting of that station's decoder gate to prevent further ringing.

In the embodiment of the invention illustrated for application to carrier or multiplex circuits dial selector units are employed at several stations of a carrier or micro-wave multiplex system to provide selective dial signalling over conventional carrier or microwave multiplex signalling paths permitting any station on the system to dial (signal) any other station on the system, and further, wherein answering by the called station operates the necessary signal to reset its decode gate and dial selector to trip the ring and wherein all stations returning their telephone instrument to an on-hook condition will reset all decode gates and dial selector units.

In the application of the invention provided for use in a local dial intercom system, a single dial selector is provided to actuate the decoder gates of the respective stations as actuated over a common input circuit from the telephone instruments.

With the foregoing in mind, among the important objects of the invention is the provision of a self-contained signalling apparatus for use in conjunction with a party line communication system to convert dial pulses to signal the selected party, the signalling apparatus being solid state employing computer logic and JK flip-flops in integrated chip form for high reliability.

The invention will be better understood from a reading of the following detailed description when taken in the light of the accompanying drawings wherein:

FIG. 4 is a block diagram of an application of the invention to open wire or cable systems;

FIG. 5 shows the invention in block diagram applied to carrier or multiplex circuits.

GENERAL DESCRIPTION

Because of the nature of standard signalling circuits used in normal communication circuits, use of the dial selector must be considered in two basic applications: (1) Where signalling is carried by physical wire lines or cable pairs as shown in FIG. 4; and (2) where signalling is carried by some type of tone signalling, as in carrier and multiplex applications as shown in FIG. 5.

In the case of wire line or cable systems, the signal inputs ("E" lines) of all dial selectors are connected together. Therefore, when any given station comes off-hook, causing the split-winding battery feed relay to pull-in (operate), the "M" lead (send) of that station puts a low (−5 volts) on the input of the common "E" line. The positive side of the 5 volt logic power supply is ground or zero volts (high). As the station telephone instrument is dialed, the relay is pulsed, causing the input to all dial selectors to be pulsed.

Figures 1, 2:
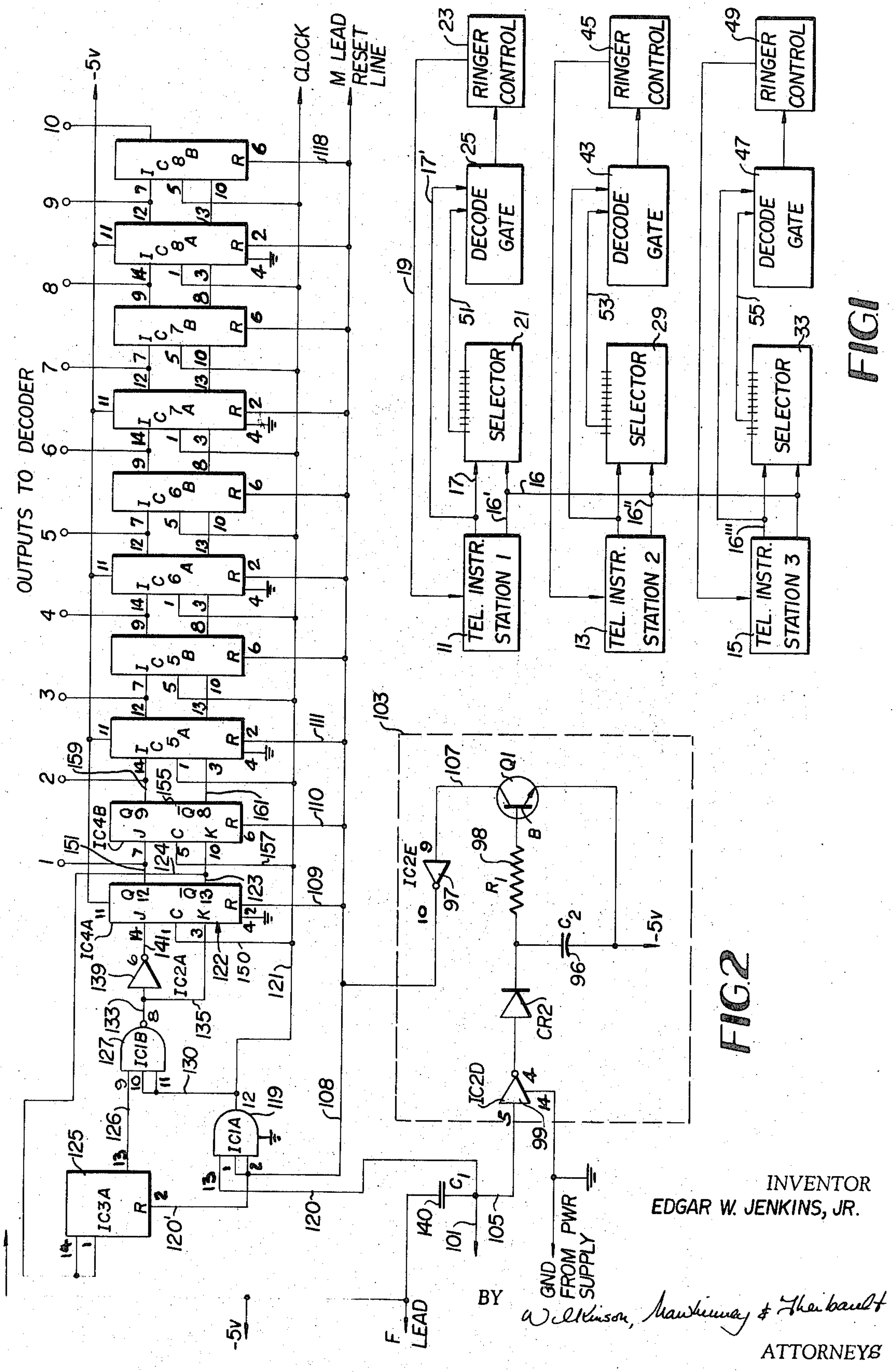
FIG. 1 is a schematic arrangement showing a plurality of interconnected stations for selective signalling.
FIG. 2 is a detailed circuit diagram of the dial selector including input logic and resetting circuitry.

With respect to FIG. 1, the general principles of the invention can be understood by considering the system applied to Stations 1, 2 and 3, although the circuitry is extensible to practically unlimited numbers of stations in the same manner that Stations 2 and 3 have been added to Station 1. The dial pulsers comprise telephone 11 for Station 1, telephone 13 for Station 2 and telephone 15 for Station 3.

In Station 1, connections from telephone 11 for the on-hook and off-hook conditions are represented by wires 17 and 17′ which provide for resetting dial selector 21 and decode gate 25 when telephone 11 is in an off-hook condition. Ringer control 23 is connected to telephone 11 by wire 19, enabling the ringer control to ring telephone 11 when so commanded by dial selector 21.

Telephone 11 is connected to the dial pulse input of dial selectors 21, 29 and 33 through wires 16′ and 16. In a similar manner, telephone 13 is connected over leads 16″ and 16 to all three selectors. Again similarly, telephone 15 is connected over leads 16‴ and 16 to all three selectors. Station 2 contains the same equipment as Station 1, i.e., decoder 43 and ringer control 45 with Station No. 3 including decoder 47 and ringer control 49.

However, it should be noted that at Station 1, the number one output of selector 21 provides the output for decoder 25 over lead 51, whereas at Station 2, the number two output from selector 29 actuates decoder 43 over lead 53, and the number 3 output of selector 33 at Station 3 actuates decoder 47 over lead 55.

The dial selectors 21, 29 and 33 are identical in that each comprises a JK chain of flip-flops, connected in a counting mode, as can be seen in FIG. 2. The dial selectors all receive the same pulses from the dialing telephones, such that each counts simultaneously with the others. For example, if Station 3 is calling Station 2, it is clear that both dial selectors 21 and 29 will receive the first pulse of the two pulses to be dialed to reach Station 2. Although the first pulse will be fed over line 51 from dial selector 21 of Station 1 to its decoder 25, the decoder will recognize that this is a temporary dialed pulse, as it will have disappeared after a predetermined amount of time, and thus decoder 25 will maintain a no go condition for ringer 23. However, at station 2 the dial selector 29 is connected to influence decoder 43 only on the second pulse, but in this case no further pulses are forthcoming and the logic and timer of decoder 43 recognizes this fact and provides a go signal to ringer 45 which in turn sounds the bell in telephone 13. When telephone 13 is answered, its dial selector and decode gate is reset over the reset line.

DIAL SELECTOR

The foregoing will be further clarified from a consideration of further figures hereinafter to be described.

In FIG. 2, the details of a dial selector, adapted to be located at each station, are shown and will now be described in connection with the overall operation.

When all stations on the party line circuit are idle, i.e., all telephone instruments are in an on hook condition (hung up), the so-called "E" or signal receive relay at each station is in an open condition and presents an open circuit to the input of the dial selector unit. The dial selector unit interprets this open circuit as a high. The term "high" refers to the more positive logic voltage level or a logic "1." The term "low" is analogous to the more megative logic voltage level or a logic "0."

With a high presented to the input lead 101 (FIG. 2) of the dial selector unit at each station, the reset circuit (dashed outline 103) consisting of inverter IC2D (shown at 99), diode CR2, inverter IC2E (shown at 97), transistor Q1, resistor R1 (shown at 98) and capacitor C2 (shown at 96) applies a low to pins 1 and 2 of NAND gate IC1A (shown at 119) via leads 105, 107 and 108; and to the reset inputs R (via lead 108, 120′, and branch leads, such as 109, 110, etc.) of all JK flip flops IC3A and (IC4A–IC8B) at each station. This is accomplished as follows: The high presented to pin 5 of inverter IC2D by the open "E" relay over leads 101 and 105 is inverted by inverter IC2D and applied to the base B of transistor Q1 as a low. This low keeps Q1 cut off, putting a high on pin 9 of inverter IC2E over lead 107 which inverts this condition to a low at output pin 10. This low is applied, over leads 107 and 108 to pins 1 and 2 of NAND gate IC1A and to input R of IC3A and of all JK flip flops in the counter chain, holding them in reset or low output condition. At the sam time, the open presented to the input lead 101 of the dial selector is seen as a high at pin 13 of gate IC1A via lead 120. Gate IC1A is a three input NAND gate which requires that all three inputs be high to gate on. Therefore, with pins 1 and 2 low and pin 13 high, gate IC1A is gated off and its output at pin 12 is high. Therefore, the clock line 121 feeding NAND gate IC1B and the JK flip flops also is high.

It should be noted that the JK flip flops are identified by their integratd chip numbers as IC4A–IC8B and these stages, of course, may be continued in number of correspond to the number of sations to accommodate a practically unlimited number of stations associated with the same party line communication system.

With the flip-flop, IC4A, shown at 122 in reset, its output at pin 12 is low and at pin 13 is high. The high from pin 13 is applied over leads 123 and 124 to JK flip flop IC3A, shown at 125, being applied thereto over input pins 1 and 14. At the same time, the low presented by the reset line 120′ is applied to pin 2 of flip flop 125 (IC3A) over leads 108 and 120′. This results in a high output at pin 13 of flip flop IC3A which is applied over lead 126 to pin 9 of NAND gate IC1B, shown at 127. Since the high output from pin 12 of gate IC1A, shown at 119, is applied to pins 10 and 11 of gate IC1B over leads 121 and 130, this NAND gate is gated on, resulting in a low output at its pin 8 on lead 133. This low is applied directly to input K, over branch lead 135, of the first JK flip flop IC4A, shown at 122. This low is also inverted by inverter IC2A, shown at 139, and applied over lead 141 to input J of IC4A as a high.

As may now be appreciated, with all stations on hook, each dial selector, such as the circuit of FIG. 2, is in a stable reset condition (being held thusly by the reset circuit) with all signal outputs (shown as the upper output terminals labeled consecutively from 1 through 10) in a low state. This condition is the condition of no output from the dial selector because its output is defined as a high at one of the terminals 1 through 10, which output will be used to influence the decode gate and ringer of FIG. 3, later to be described.

Now, when any station in the system comes off hook, the "E" relay at all stations operates, applying −5 volts (a low) to the input lead 101 of each selector unit. This change of input from a high to a low is not a true dial pulse and must not be counted as such. Therefore, NAND gate IC1A, shown at 119, must be prevented from gating on when this change appears.

When any station in the system comes off hook prior to dialing a call, the resulting low is applied over leads 101 and 105 to IC2D inverter 99 which causes a high to be applied to the base B of transistor Q1 via resistor R1 of 10,000 ohms, shown at 98. This produces forward bias, cuasing the transistor to conduct, which conduction places a low on lead 107 to pin 9 of inverter IC2E, shown at 97. This low is converted to a high on lead 107 and applied to reset lead 108, thereby effectively lifting the reset condition from the JK flip flops IC3A and (IC4A–IC8B) and preparing the selector to count. At the same time, this high is also applied, by lead 108, to pins 1 and 2 of gate IC1A, shown at 119. However, since operation of the "E" relay has already applied a low to pin 13 of gate 119, via leads 101 and 120, it cannot gate to an on condition, because all three inputs must be high for the NAND gate to gate on, but, later, during dialing, with a high applied to pins 1 and 2 of NAND gate IC1A at 119, a high applied to pin 13 will cause it to gate on, changing its output at pin 12 from a high to a low.

When the calling station, which is now off hook, moves the dial off normal, a given number of digits, say five, and releases the dial, the "E" relay at each station will follow the pulse produced by the dial contacts. As the contacts of the "E" relay at each station open and close (at a rate of approximately 14 pulses per second), the input to each dial selector is changed from low to high and back to low again. Since these pulses are relatively long in duration, capacitor C1, shown at 140 (FIG.2), is used effectively to shorten the pulses through its charging action to permit counting by the much faster solid state counting circuits.

Th ocurrence of the first true dial pulse at the input lead 101 of each dial selector produces a high at pin 13 of gate IC1A, shown at 119, by way of lead 120. This high also is applied to the reset circuit 103 at pin 5 of inverter IC2D shown at 99. But capacitor C2, shown at 96, has charged during the preceding off hook time and now attempts to discharge through resistor 98 and transistor Q1 thereby maintaining a high on the reset line 108 and at pins 1 and 2 of gate IC1A, at 119. The relatively long discharge time of capacitor C2, shown at 96, prevents transistor Q1 from ceasing to conduct during the dial pulse.

Now, pins 1 and 2 and 13 of NAND gate IC1A, at 119, all have a high applied to them and IC1A gates on, producing a low at its output pin 12. When this low is applied to pins 10 and 11 of NAND gate IC1B, at 127, over lead 130, this latter gate begins to gate off. However, at the same time the same low is applied through the clock line 121 to input C of the first JK flip flop, IC4A, over branch lead 150. First, IC4A, shown at 122, already had a high on its input J, at lead 141, and a low on its input K, at lead 135, thus the application of the low clock pulse on input C over lead 150 causes flip flop 122 to flip to present a high to its output Q shown at pin 12, on lead 151, and a low at its output Q shown at pin 13 at lead 123.

By the time NAND gate 127 or IC1B is completely gated off, which changes its output from a low to a high at pin 8 on lead 133, the clock pulse applied to input C of JK flip flop IC4A, shown at 122, has shifted back to high. If the clock pulse were to remain low after gate IC1B 127 gated off, (resulting in a high being applied to input K and a low to J through inverter IC2A at 139), this low clock pulse would cause JK flip flop IC4A, at 122, to flip once again so that a low would appear at output Q on lead 123.

Now, that the first pulse has been received and counted, the output of JK flip flop IC4A at pin 13 on lead 123 has shifted from its earlier high to low. This low is applied over lead 124 to pins 1 and 14 of flip flop IC3A which now has a high on pin 2 (R) applied from 120′ at 125, causing it to change its output at pin 13 or lead 126 from a high to a low. This condition will remain throughout the remainder of the dialing sequence. The low output from flip flop IC3A at 125 is connected over leads 126 at pin 9 of NAND gate IC1B, at 127, and therefore this gate will gate off and stay off.

Upon receipt of the second dial pulse, NAND gate IC1A, at 119, gates on again, in the manner above explained, and causes a low to appear at its output pin 12, which is applied to the clock line 121 and pins 10 and 11 of gate IC1B over leads 130. However, since pin 9 of gate IC1B is already low and is gated off, its state will not change. Therefore, output pin 8 of gate IC1B remains high and this high is applied directly to input K of the JK flip flop IC4A over lead 135. This high is also inverted by IC2A, shown at 139, and applied to the input J of flip flop 122 as a low. With the low from the clock line applied to input C over lead 150, JK flip flop IC4A flips a second time so that its output pin 12 goes low and output pin 13 high. However, at the instant that IC4A starts to flip, its outputs are high on pin 12 and low on pin 13, respectively at leads 151 and 123. This results in a high on input J of JK flip flop IC4B, at 155, by way of lead 151 and a low at input K over lead 123. The low clock pulse applied to input C over lead 157 of JK flip flop IC4B causes it to flip so its output Q at pin 9 at lead 159 goes high, as is manifested at terminal 2, and Q at pin 8 on lead 161 goes low, resulting in the output from the dial selector being on the number two terminal as a high for the second true dial pulse.

Pin 13 of the JK flip flop IC4A is now presenting a high over lead 124 to pins 1 and 14 of flip flop IC3A, at 125. However, flip flop IC3A is strapped to flip on a low on these pins so it will not change state. This means that gate IC1B, shown at 127, remains gated off.

Subsequent dial pulses are counted in the same manner as the pulse sequence just described, and if station number 5 is dialed, then output number 5 goes high and all other outputs remain low. This is, of course, true for all dial selectors in the system, but only at station number 5 is the decoder gate and ringer responsive to output number 5 as will now be described.

DECODE GATE AND RINGER CONTROL

Figure 3:
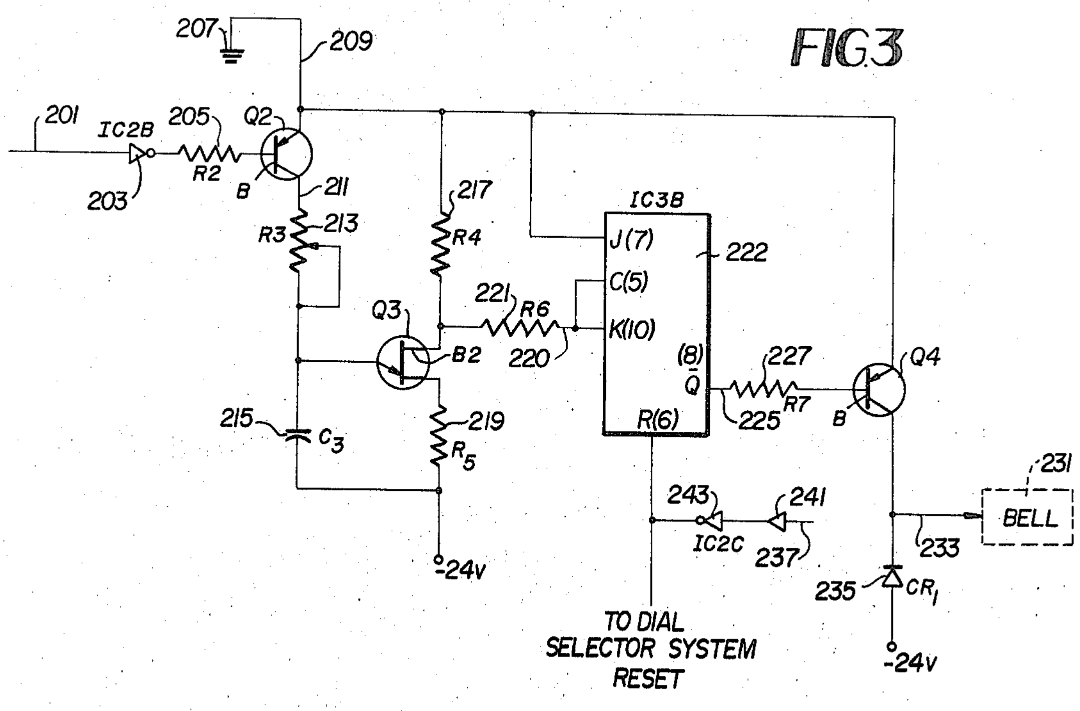
FIG. 3 is a detailed diagram of the decoder gate and ringer circuitry.

In FIG. 3 there is depicted the decoder or decode gate and ringer circuitry provided at each station. The input lead 201 is connected to its associated dial selector at the dial selector output terminal corresponding to the station number. Thus, if the decode gate and ringer circuitry of FIG. 3 is discussed as comprising a portion of the apparatus at station number 5, then the input to lead 201 is taken from the number 5 output lead of the dial selector at station number 5. Therefore, when station number 5 is dialed, its dial selector output on the number 5 terminal goes high, after five dialing pulses have occurred. Then inverter IC2B, shown at 203, converts this high to a low and applies this low to the base B of transistor Q2, by way of resistor R2 of 470 ohms, shown at 205, causing Q2 to conduct. This effectively applies ground from point 207 over leads 209 and 211 to the uni-junction timer circuit (UJT) comprising 15K ohm resistor R3, shown at 213, capacitor C3, shown at 215, unijunction transistor Q3, resistor R4, identified at 217, and resistor R5, shown at 219.

Capacitor C3 then begins to charge through resistor R3 until it reaches the peak point firing voltage of unijunction transistor Q3. At this point Q3 starts conducting to pass current through resistors 217 and 219. Also, at this time, capacitor C3, shown at 215, discharges through R5, shown at 219, and transistor Q3. After C3 is discharged, Q3 shuts off and C3 begins to charge again. The cycle repeats itself.

The output of UJT timer circuit is a positive saw tooth wave form which is applied from electrode B2 of UJT Q3 through resistor R6, shown at 221, in lead 220 to pins 5 and 10 (C and K) of bistable flip flop IC3B, shown at 222. The first positive pulse causes the output of IC3B to change from high to low, the output being taken at Q or terminal 8. This low is applied over output lead 225, and by way of isolation resistor R7, shown at 227, to the base B of transistor Q4, causing Q4 to conduct. Transistor Q4 is a relay driver used to operate a signalling relay or a solid state switching device which operates the bell, buzzer or signalling lamp at station number 5. A bell and its operating relay are shown in dotted outline in block 231 for energization over the "E" lead 233. Diode $CR_1$, shown at 235, is provided as shunt protection for driver Q4 to avoid high voltage transients.

The second positive pulse applied to bistable flip flop IC3B from the UJT timer circuit causes it to flip back to its original state and put a high on the base of Q4, causing it to cut off. Thus, if Q4 alternatively flips and cuts off, the output to the signalling circuit is pulsed to provide pulse signalling.

When the party called answers, the station "M" or transmit leads 237, which is also the reset lead 108 of FIG. 2, causes this flip flop to go high and cut off Q4, thus stopping the ringing. A buffer stage including diode 241 and inverter IC2C, shown at 243, is included in the "M" or reset line.

If the called party fails to answer, the calling party hangs up, returning the selector unit inputs to a high, which resets all selectors to the start position, thus silencing the ringing by relieving the signal from lead 201. Also, at the conclusion of a conversation, hanging up of the parties performs the same reset function.

An important function of the decoder section of the circuitry of FIG. 3, including the UJT timer, is the ability to distinguish the last pulse dialed or a constant high on lead 201, from any interim dial pulse high on lead 201. This is necessary because the input leads 201 for stations 1, 2, 3 and 4 were each caused to go high as the dial pulses in the dialed number 5 were received. The time constant, for the UJT timer, including capacitor C3, is adjusted so that dial pulses produced highs on leads 201 do not remain long enough to cause the unijunction Q3 to be fired. Thus, ringing is avoided in the uncalled stations.

In summary relative to FIG. 3, the RC time constant associated with the UJT (Q3) serves two purposes. Firstly, the charging time of C3 is slow when compared to the time between dial pulses. Therefore, during the selection of, say for instance, Station No. 3, the decoder connected to IC4A at Station No. 1 and IC4B at Station No. 2 will not ring when their respective selectors step through Stations No. 1 and No. 2 enroute to the Station No. 3 select condition. Secondly, the charge and discharge cycle of this circuit results in pulsing of IC3B output and subsequent pulsing of Q4 (relay driver) resulting in a pulsing ringing signal as opposed to a steady ring as found on conventional relay type selectors.

SIGNALLING OVER OPEN WIRE OR CABLE SYSTEM

In FIG. 4 there is provided an example of the present invention applied to open wire or cable systems wherein a plurality of stations, illustrated by telephone instruments 301, 302, and 303, are operated in a party line manner, each being equipped with its own signalling device (bell, buzzer, lamp, etc. 304, 305 and 306). Likewise, each station is equipped with its own dial selector and decode gate, i.e., 307 and 310 for Station No. 1, 308 and 311 for Station No. 2 and 309 and 312 for Station No. N. The purpose of so equipping each station is to provide the capability of any station selectively signalling any other station.

Each station is equipped with a split-winding battery feed relay, as 313 for Station No. 1, to operate contacts 314, etc. for applying −5 volts over common "E" line to all dial selectors in the system. Thus, dial pulses have access over the "E" line to all dial selectors which provide a high on the output line of the selected station. If Station No. 1 were dialed, dial selector 310 would have a high at lead 350 actuating decode gate 307 cuasing signal No. 1 at 304 to operate. When Station No. 1 answers, by removing its telephone from the hook, internal contacts in telephone 301 will apply a reset signal over line 340 to dial selector 310 and decode gate 307 to trip the ring.

At the end of the converstation, both parties hang up and the split-winding relays are released, opening their contacts, removing the −5 volts from the "E" line and causing all dial selectors to reset.

SIGNALLING OVER CARRIER OR MULTIPLEX CIRCUIT

In FIG. 5 there is provided an example wherein a plurality of stations are connected in a party-line manner over carrier or multiplex communication circuits equipped with conventional E & M signalling equipment. FIG. 5 shows a typical party-line station equipped with a telephone instrument, 401; and E & M-to-loop dial converter, 402; a dial selector, 403; a decode gate, 404, a 20 HZ ringing source, 405 all connected into conventional carrier or two wire to four wire connection (2W/4W) audio hybrid 406; a channel transmit unit, 407; a channel receive unit, 408; a signal send unit, 409 and a signal receive unit, 410. Each station on the system is the same as the one depicted above.

Assume the station in FIG. 5 has its dial selector, 403, strapped to provide a high output to decode gate 404 2hen two dial pulse signals are received from "E" relay 411. If some other station in the system comes off hook, his "M" lead (same as 420) will key his signal send unit (same as 409) causing a signal to appear at all signal receive units (same as 410) in the system. This will release reset on the dial selector units. As the calling station dials the "2," his signal send unit will send out two pulses which will be received at all signal receive units. At the station in FIG. 5, the received signal will cause "E" relay 411 to pulse the dial selector 403 twice, causing it to place a high on decode gate 404. Gate 404 will key the "E"0 lead in LDC 402 which will apply the ringing voltage from 20 HZ source 405 to telephone 401.

When the station in FIG. 5 answers, his LDC (E and M loop dial converter) 402 will key his "M" lead which will trip the ring by resetting dial selector 403 and decode gate 404.

At the end of the conversation when all telephone instruments are again on-hook, no "M" leads (420) will be keyed so no signal will be received at any station. Therefore all "E" relays will release and all dial selectors will reset.

SIGNALLING APPLIED IN LOCAL DIAL INTERCOM SYSTEM

Figure 6:
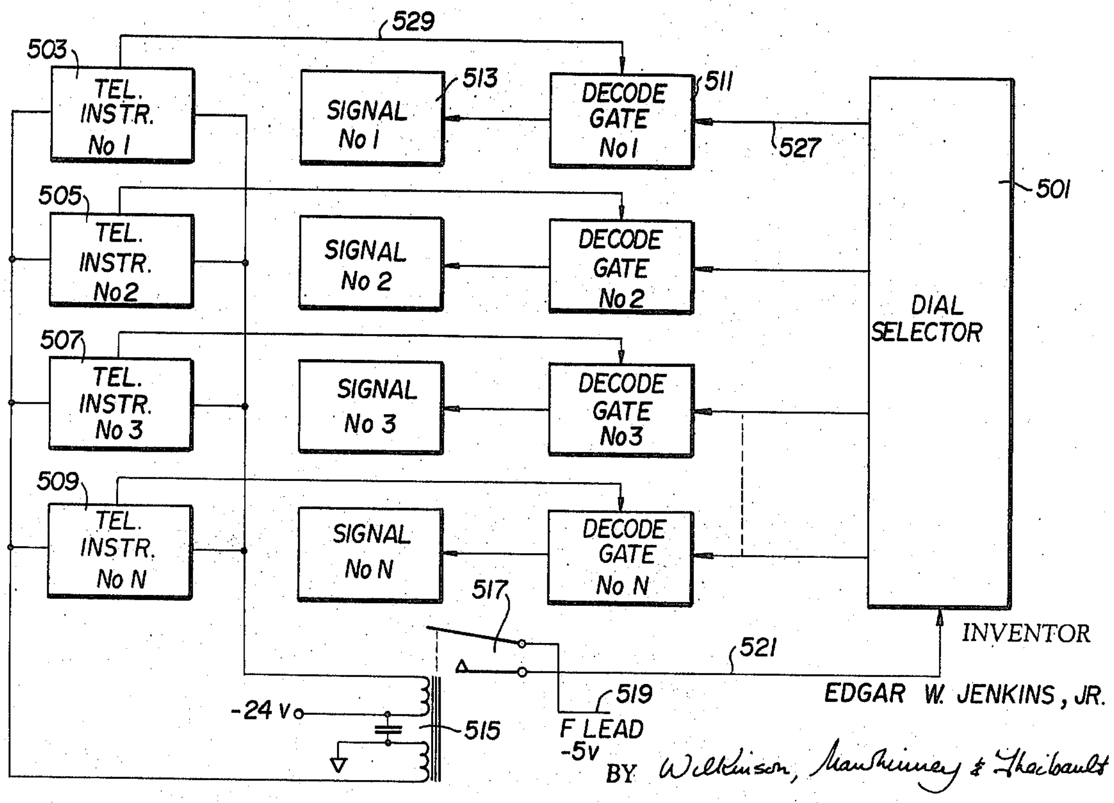
FIG. 6 is a block diagram of the invention applied to a local dial intercom system.

In FIG. 6 there is depicted in block form a typical application of the present signalling invention applied for use in a local dial intercom system wherein a single dial selector 501 may be employed to serve a plurality of stations, illustrated by telephone instrument 503 at station number 1, instrument 505 at station number 2, instrument 507 at station number 3, and instrument 509 at telephone station N.

It may be seen that each station includes a decoding gate, such as 511 for station 1, and a signalling device, such as 513 for station number 1.

Also all telephone instruments are connected over split winding battery feed relay 515 to operate common contacts 517 for applying −5 volts from "F" lead 519 over common "E" lead 521 to the single dial selector 501. Thus, dial pulses have access over lead "E" to the dial selector which provides a high on the output lead dialed. If station number 1 were dialed, output lead number 1, shown at 527, would remain high to actuate its decode gate 511 for signalling the block 513, which signalling device may be included in telephone instrument 503. Reset lead 529 is provided for resetting the decode gate 511 upon answer by telephone instrument 503. Reset for dial selector is provided from "E" lead input. That is, when all stations hang-up (go to on-hook), "E" lead input will go high causing selector to reset. The telephone instruments are modified by extending a pair of N.O. when on hook contacts over telephone set cord to decode gate to furnish reset needed to trip ring when calling party answers.

What is claimed is:

1. In a dial party line communication system for a plurality of stations; separate solid state signalling apparatus operable by dial pulses for association with each of the plurality of stations; said signalling apparatus comprising means for independently producing dial pulses at each station; dial selector means at each station connected together for stepping in like predetermined sequence by dial pulses originated from any station; a plurality of output connections for each dial selector means activated in said like sequence; and decode gate ringer means for each station respectively connected to an assigned output connection of the dial selector means of its station; said associated ringer means activated by a unique number of pulses and responsive to selective operation only by the dial selector means of its station.

2. The apparatus of claim 1 comprising *N* number of stations and *N* number of output connections for each dial selector means; the output connections of the dial selector means of Station No. N comprising a lead from the Nth number output connection to the N station decode ringer means; and connections between the dial selector means and decode ringer means of all other respective stations being selectively from the output connections of the selector means in accordance with the station number.

3. The apparatus of claim 2 wherein the means for producing pulse dial pulse comprise a telephone and further comprising a connection from the decode ringer means to the telephone at each station.

4. The apparatus of claim 3 comprising reset means at each station operable by its associated telephone to reset the dial selector means and the decode ringer means at the respective station.

5. The apparatus of claim 4 further comprising a connection from each telephone to the connected together dial selector means of all stations.

6. The apparatus of claim 5 wherein each decode ringer means comprises a timer circuit; bistable means responsive thereto; and driver means responsive to the bistable means.

7. The apparatus of claim 5 wherein each dial selector means comprises a JK connected counting chain of flip flops and input means for operating the JK chain of flip flops in accordance with dial pulses received by said dial selector means; the output connections from the dial selector means being respectively taken from the stages of the JK flip flop chain.

8. The apparatus of claim 1 comprising reset means at each station for resetting the dial selector means at the respective stations; and means responsive to the decode ringer means for causing ringing at each station. causing ringing at each station.

9. The apparatus of claim 8 wherein each dial selector means comprise a JK chain of flip flops and the output connections for each dial selector means comprises output leads for the respective stages of the JK flip flop chain.

10. The apparatus of claim 9 wherein the decode ringer means for each station comprises timing means; bistable means responsive to the timing means; and means for driving the ringing means in response to operation of the bistable means.

11. In a party line communication system, solid state signalling apparatus for association with a plurality of stations; said signalling apparatus comprising means for independently producing dial pulses at each station; dial selector means at each station operable in like stepping sequence by dial pulses originated from any station; a plurality of output connections for each dial selector means adapted to be sequentially energized to a predetermined level of energization by the dial pulses until the dial selector means is reset; decode gate ringer means for each station responsive only to selective operation of the associated dial selector means at the respective stations; ringing means disposed at each station in the decode gate ringer means; said decode gate ringer means comprising an input lead connected to one of said output connections; capacitor charging means connected to each input lead; means for causing the capacitor charging means to charge to a predetermined level in response to persistence of said predetermined energization level applied to said input lead; means responsive to the predetermined level of capacitor charge to discharge the capacitor and means responsive to the capacitor charge and discharge to produce pulsing ringing signalling at said ringing means.

12. The apparatus of claim 11 wherein said means responsive to the predetermined capacitor charging level comprises unijunction means.

13. The apparatus of claim 11 wherein the means for independently producing dial pulses at each station comprises telephones; and reset means at each station effective to reset the dial selector means upon hang up.

14. The apparatus of claim 13 comprising means at each station to render said means responsive to the capacitor charge and discharge ineffective upon answer at the station dialed.

15. The apparatus of claim 14 wherein each dial selector means comprises a chain of flip flops connected in stages for sequential operation to said predetermined level of energization in accordance with the dialed pulses.

16. The apparatus of claim 15 comprising an input circuit for the chain of flip flops responsive to off hook condition of any station to arm the chain of flip flops for stepping by rendering the reset means ineffective.

17. The apparatus of claim 16 wherein said input circuit comprises settable means for precluding signals applied to the input circuit other than dial pulses from initiating stepping of the flip flop stages.

18. The apparatus of claim 17 wherein said input circuit further comprises gate mean respectively gated effective for each dial pulse to cause stepping of the flip flop stages.

19. In a party line communication system, signalling apparatus for association with a plurality of stations; said signalling apparatus comprising means for independently producing dial pulses at each station; dial selector means at each station respectively interconnected and operable in like stepping sequence by dial pulses originated from any station except the dial selector means at the dialing station; means at each station precluding stepping of its dial selector means when the associated station is dialing; a like plurality of output connections for each dial selector means; said output connections of each dial selector means sequentially energized to a predetermined level of energization by the dial pulses except for the dialing station dial selector output connections; decode gate ringer means for each station connected to only one output connection of its station and responsive only to selective operation of the associated dial selector means at the respective stations to respectively different numbers of dialed pulses; ringing means disposed at each station responsive to operation of the decode gate ringer means, delay means in the decode gate ringer means precluding operation of the ringing means for a predetermined period after energization of the decode gate ringer means whereby ringing at unselected stations is avoided, said dial selector means comprising a chain of JK connected flip flop stages; and said output connections being in circuit with the respective stages.

20. The apparatus of claim 19 wherein said JK chain of flip flop stages comprises an input circuit; means in said input circuit for discriminating dial pulses and stepping the flip flop stages in accordance with dial pulses only.

21. The apparatus of claim 20 wherein said input circuit further comprises means responsive to signals occasioned by any station preparing to transmit dial pulses; said last mentioned means arming the dial selector means.

22. Signalling apparatus for use in conjunction with a party line communications system having a plurality of stations with a telephone instrument at each station comprising, in combination, a plurality of dial selector means respectively at the stations and having respectively a different output connection for each of said stations; each dial selector means comprising a JK chain of flip flop stages connected as a stepping counter; the output connections respectively connected to different stages for the stations; decode gate means at each station responsive to an output connection of the dial selector means respectively for each station; means connecting each telephone instrument to the dial selecting means to enable dial selective signalling of any other station; said decode gate means of any station dialed being connected to signal calling at the station dialed; each of said decode gate means comprising an input lead connected to the output connection to which it is responsive; capacitor charging means; means for causing the capacitor charging means to charge to a predetermined level via the input lead in response to calling the associated station; means responsive to the predetermined level of capacitor charge to discharge the capacitor; and means responsive to the capacitor charge and discharge to produce pulsing ringing signalling at the called station.

23. The apparatus of claim 22 comprising reset means at each station between the telephone instrument and its decode gate means.

24. The apparatus of claim 22 comprising means at each station to render said means responsive to the capacitor charge and discharge ineffective upon answer at the station dialed.

25. The apparatus of claim 22 wherein said dial selector means comprises an input circuit for the chain of flip flops responsive to off hook condition of any station to arm the chain of flip flops for stepping in accordance with dialed pulses.

26. The apparatus of claim 25 wherein said input circuit comprises settable means for precluding signals applied to the input circuit other than dial pulses from initiating stepping of th flip flop stages.

27. In a party line intercom communication system, signalling apparatus for association with a plurality of stations; said signalling apparatus comprising means for independently producing dial pulses at each station; dial selector means common to all stations and operable in stepping sequence by dial pulses originated from any station; output connections for the dial selector means adapted to be sequentially energized to a predetermined level of energization by the dial pulses; decode gate ringer means for each station responsive respectively to said output connections by selective operation of the common dial selector means; and ringing mean disposed at each station responsive to operation of the decode gate ringer means at each station; said dial selector mans comprising a chain of JK connected flip flop stages; and said output connections being in circuit with the respective stages.

28. The apparatus of claim 27 wherein said JK chain of flip flop stages comprises an input circuit; means in said input circuit for discriminating dial pulses and stepping the flip flop stages in accordance with dial pulses only.

29. The apparatus of claim 28 wherein said decode gate ringer means each comprise an input lead connected to one of said output connections; capacitor charging means; means for causing the capacitor charging means to charge to a predetermined voltage level in response to persistence of said predetermined energization level applied to said input lead; means responsive to the predetermined level of capacitor charge to discharge the capacitor; and means responsive to the capacitor charge and discharge to produce pulsing ringing signalling at the ringing means disposed at the dialed station.

* * * * *